United States Patent
Hakusui

(10) Patent No.: US 7,248,577 B2
(45) Date of Patent: Jul. 24, 2007

(54) VIRTUAL PBX BASED ON SIP AND FEATURE SERVERS

(75) Inventor: Shigeaki Hakusui, Boxford, MA (US)

(73) Assignee: Symbolic Intelligence Enhanced Systems, Inc., Boxford, MA (US)

(*) Notice: Subject to any disclaimer, the term of this patent is extended or adjusted under 35 U.S.C. 154(b) by 0 days.

(21) Appl. No.: 10/729,871

(22) Filed: Dec. 5, 2003

(65) Prior Publication Data

US 2004/0170268 A1 Sep. 2, 2004

Related U.S. Application Data

(60) Provisional application No. 60/431,038, filed on Dec. 5, 2002.

(51) Int. Cl.
*H04L 12/66* (2006.01)

(52) U.S. Cl. .................. 370/352; 370/389; 370/401; 379/93.01

(58) Field of Classification Search ............. 370/352, 370/389, 401; 379/93.01
See application file for complete search history.

(56) References Cited

U.S. PATENT DOCUMENTS

| | | | | |
|---|---|---|---|---|
| 4,764,919 | A | 8/1988 | Hunter et al. ................ 370/60 |
| 6,031,836 | A * | 2/2000 | Haserodt .................... 370/389 |
| 6,393,017 | B1 | 5/2002 | Galvin et al. ............... 370/352 |
| 6,587,555 | B1 | 7/2003 | Cripe et al. .............. 379/211.02 |
| 6,678,359 | B1 * | 1/2004 | Gallick ..................... 379/88.17 |
| 6,775,272 | B2 | 8/2004 | Galvin et al. ............... 370/352 |
| 2002/0067818 | A1 | 6/2002 | Barathan et al. ............ 379/219 |
| 2003/0206546 | A1 * | 11/2003 | Beyda ........................ 370/352 |
| 2004/0052346 | A1 * | 3/2004 | Ohta et al. ............... 379/101.01 |
| 2004/0192292 | A1 * | 9/2004 | Chang et al. .............. 455/426.1 |
| 2004/0218583 | A1 | 11/2004 | Adan et al. ................. 370/352 |

FOREIGN PATENT DOCUMENTS

| | | |
|---|---|---|
| EP | 0696124 A2 | 2/1996 |
| EP | 1235416 A1 | 8/2002 |
| WO | WO 01/60087 A1 | 8/2001 |
| WO | WO 02/058351 A1 | 7/2002 |

OTHER PUBLICATIONS

Campbell, B. et al., RFC3428, *Session Initiation Protocol (SIP) Extension for Instant Messaging*, 17 pages, Dec. 2002.
Sparks, R., RFC3420, *Internet Media Type message/sipfrag*, 8 pages, Nov. 2002.
Camarillo, G. et al., RFC3398, *Integrated Services Digital Network (ISDN) User Part (ISUP) to Session Initiation Protocol (SIP) Mapping*, 64 pages, Nov. 2002.

(Continued)

*Primary Examiner*—Creighton Smith
(74) *Attorney, Agent, or Firm*—Bromberg & Sunstein LLP

(57) ABSTRACT

Modular internet telephony feature servers allow individual users to manage internet telephone calls. Modular internet telephony feature servers may be used in a hierarchical internet telephony system in which a higher tier internet telephony feature server forwards telephone calls to one or more lower tier internet telephony feature servers, and each lower tier internet telephony feature server is configurable separately from the higher tier internet telephony feature server and from other lower tier internet telephony feature servers to direct telephone calls received from the higher tier internet telephony feature server.

20 Claims, 14 Drawing Sheets

OTHER PUBLICATIONS

Vemuri, A. et al., RFC3372, *Session Initiation Protocol for Telephones (SIP-T): (SIP-T)*, 22 pages, Sep. 2002.

Schulzrinne, H., RFC3361, *Dynamic Host Configuration Protocol (DHCP-for-IPv4) Option for Session Initiation Protocol (SIP) Servers*, 7 pages, Aug. 2002.

Charlton, N. et al., RFC3351, *User Requirements for the Session Initiation Protocol (SIP) in Support of Deaf, Hard of Hearing and Speech-impaired Individuals*, 16 pages, Aug. 2002.

Jennings, C. et al., RFC3325, *Private Extensions to the Session Initiation Protocol (SIP) for Asserted Identity within Trusted Networks*, 17 pages, Nov. 2002.

Watson, M., RFC3324, *Short Term Requirements for Network Asserted Identity*, 11 pages, Nov. 2002.

Peterson, J., RFC3323, *A Privacy Mechanism for the Session Inititation Protocol (SIP)*, 21 pages, Nov. 2002.

Camarillo, G. et al., RFC312, *Integration of Resource Management and Session Initiation Protocol (SIP)*, 29 pages, Oct. 2002.

Rosenberg, J., RFC3311, *The Session Initiation Protocol (SIP) UPDATE Method*, 13 pages, Oct. 2002.

Roach, A. B., RFC3265, *Session Initiation Protocol (SIP)-Specific Event Notification*, 36 pages, Jun. 2002.

Rosenberg, J. et al., RFC3264, *An Offer/Answer Model with Session Description Protocol (SDP)*, 24 pages, Jun. 2002.

Schulzrinne, H., RFC3263, *Session Initiation Protocol (SIP):Locating SIP Servers*, 16 pages, Jun. 2002.

Rosenberg, J. et al., RFC3262, *Reliability of Provisional Responses in Session Initiation Protocol (SIP)*, 14 pages, Jun. 2002.

Rosenberg, J. et al., RFC3261, *SIP: Session Initiation Protocol*, 252 pages, Jun. 2002.

Campbell, B. et al., RFC3087, *Control of Service Context using SIP Request-URI*, 37 pages, Apr. 2001.

Lennox, J. et al., RFC3050, *Common Gateway Interface for SIP*, 33 pages, Jan. 2001.

Donovan, S., RFC2976, *The SIP Info Method*, 9 pages, Oct. 2000.

Petrack, S. et al., RFC2848, *The PINT Service Protocol: Extensions to SIP and SDP for IP Access to Telephone Call Services*, 69 pages, Jun. 2000.

Vaha-Sipila, A., RFC2806, *URLs Telephone Calls*, 20 pages, Apr. 2000.

Unknown, *About Vonage*, from vonage.com website, 10 pages, undated.

Unknown, *SIP Session Initiation Protocol*, 42 pages, undated.

Unknown, *SIP Relations to Other Protocols*, 9 pages, undated.

Rosenberg, J. et al., *SIP Traversal through Residential and Enterprise NATs and Firewalls*, Internet Engineering Task Force WG Internal Draft, Mar. 2001, 24 pages.

Caballero-McCann, D., *Deploying Carrier Grade Services with VoIP Technology*, Cisco Systems, Inc., Presentation, Feb. 16, 2000, 12 pages.

Unknown, *IP Telephony Solutions*, Trillium Digital Systems, Inc., 2000, 5 pages.

Thernelius, F. et al., *SIP Firewall Solutions*, SIP Working Group, Internet Draft, Jul. 2000, 24 pages.

Martin, C. et al., *SIP Through NAT Enabled Firewall Call Flows*, Midcom Working Group, Internet Draft, Feb. 2001, 63 pages.

Unknown, *Comparison of H.323 and SIP*, Nov. 2002, 6 pages.

Unknown, Vonage digitalvoice [online], [retrieved on Dec. 5, 2002] Retrieved from the website of Vonage Holdings Corps., using Internet <URL: www.vonage.com/>, 7 pages.

PCT International Search Report for International Application No. PCT/US03/389075, Nov. 17, 2004, 6 pages.

Huebner, D.L., *Intelligent Telephones and Generic Switching: A Distributed Processing PABX Architecture*, Telecommunication Switching, May 7-11, 1984, International Switching Symposium (ISS), 1984, pp. 1-6.

Foo et al., *A telephone adapter for Internet telephony systems*, Microprocessors and Microsystems 21, 1997, pp. 213-221.

Dianda et al., *Programmable Service Platforms for Converged Voice/Data Services*, Bell Labs Technical Journal, Jul.-Sep. 2000, pp. 43-58.

Examiner Vandevenne, M.*Supplementary European Search Report (Application No. EP 03 79 9877)*, European Patent Office, Feb. 16, 2006, 4 pages.

\* cited by examiner

FIG. 3    100

VIRTUAL PBX BASED ON SIP AND FEATURE SERVERS

PRIORITY

The present application claims priority from U.S. Provisional Patent Application No. 60/431,038 filed Dec. 5, 2002, which is hereby incorporated herein by reference in its entirety.

FIELD OF THE INVENTION

The present invention relates generally to telephonic communications, and more particularly to a virtual PBX (Private Branch Exchange) based on the Session Initiated Protocol (SIP) and feature servers in a Voice-over-IP (VoIP) system.

BACKGROUND OF THE INVENTION

A Private Branch Exchange (PBX) is a subscriber-owned telecommunications exchange that usually includes access to the public switched telephone network (PSTN). The PBX can typically provide various advanced telephone services, such as call hold, call transfer, call forwarding, and conferencing, to name but a few. PBX systems are generally costly, both for setup/maintenance and on a per-extension basis.

A Voice-over-IP (VoIP) system is a telephonic communication system in which telephonic communications are carried over a communication network, such as the Internet or a private intranet, using the Internet Protocol (IP). One advantage of a VoIP system is that long distance phone charges can be substantially eliminated, since long-distance voice traffic can be carried over the Internet essentially for free. A PBX system can be used in conjunction with a VoIP system, in which case the PBX handles telephonic communications within the subscriber network and any voice traffic needing to go outside of the subscriber network can be carried over the VoIP system.

Some broadband (BB) phone services utilize the Media Gateway Control Protocol (MGCP). It is a simple solution and fits very well into the single home residential market with an ADSL connection, while requiring a GIP (Global Internet Protocol) address at the client. However, the MGCP-based BB-phone faces a formidable challenge with Multi-dwelling Units (MDU), apartments/condominiums and business applications. It is difficult to obtain accessibility from the Internet to the GIP inside the LAN.

Another protocol that is often used for VoIP is the Session Initiated Protocol (SIP). SIP is well-known in the Internet community, and is described in the following Internet Engineering Task Force (IETF) Request For Comments (RFC) documents, all of which are hereby incorporated herein by reference in their entireties:

RFC3428, Session Initiation Protocol (SIP) Extension for Instant Messaging, B. Campbell, Ed., J. Rosenberg, H. Schulzrinne, C. Huitema, D. Gurle, December 2002;

RFC3420, Internet Media Type message/sipfrag, R. Sparks, November 2002;

RFC3398, Integrated Services Digital Network (ISDN) User Part (ISUP) to Session Initiation Protocol (SIP) Mapping, G. Camarillo, A. B. Roach, J. Peterson, L. Ong, November 2002;

RFC3372 (BCP0063), Session Initiation Protocol for Telephones (SIP-T): (SIP-T), A. Vemuri, J. Peterson, September 2002;

RFC3361, Dynamic Host Configuration Protocol (DHCP-for-IPv4) Option for Session Initiation Protocol (SIP) Servers, H. Schulzrinne, August 2002;

RFC3351, User Requirements for the Session Initiation Protocol (SIP) in Support of Deaf, Hard of Hearing and Speech-impaired Individuals, N. Charlton, M. Gasson, G. Gybels, M. Spanner, A. van Wijk, August 2002;

RFC3325, Private Extensions to the Session Initiation Protocol (SIP) for Asserted Identity within Trusted Networks, C. Jennings, J. Peterson, M. Watson, November 2002;

RFC3324, Short Term Requirements for Network Asserted Identity, M. Watson, November 2002;

RFC3323, A Privacy Mechanism for the Session Initiation Protocol (SIP), J. Peterson, November 2002;

RFC3312, Integration of Resource Management and Session Initiation Protocol (SIP), G. Camarillo, Ed., W. Marshall, Ed., J. Rosenberg, October 2002;

RFC3311, The Session Initiation Protocol (SIP) UPDATE Method, J. Rosenberg, October 2002;

RFC3265, Session Initiation Protocol (SIP)-Specific Event Notification, A. B. Roach, June 2002;

RFC3264, An Offer/Answer Model with Session Description Protocol (SDP), J. Rosenberg, H. Schulzrinne, June 2002;

RFC3263, Session Initiation Protocol (SIP): Locating SIP Servers, J. Rosenberg, H. Schulzrinne, June 2002;

RFC3262, Reliability of Provisional Responses in Session Initiation Protocol (SIP), J. Rosenberg, H. Schulzrinne, June 2002;

RFC3261, SIP: Session Initiation Protocol, J. Rosenberg, H. Schulzrinne, G. Camarillo, A. Johnston, J. Peterson, R. Sparks, M. Handley, E. Schooler, June 2002;

RFC3087, Control of Service Context using SIP Request-URI, B. Campbell, R. Sparks, April 2001;

RFC3050, Common Gateway Interface for SIP, J. Lennox, H. Schulzrinne, J. Rosenberg, January 2001;

RFC2976, The SIP INFO Method, S. Donovan, October 2000;

RFC2848, The PINT Service Protocol: Extensions to SIP and SDP for IP Access to Telephone Call Services, S. Petrack, L. Conroy, June 2000; and RFC2806, URLs for Telephone Calls, A. Vaha-Sipila, April 2000.

Generally speaking, SIP uses proxy servers that reside outside of the subscriber network (i.e., coupled to the Internet) to enable telephonic communications to and from telephones within the subscriber network. Specifically, the subscriber network typically includes a router that interfaces the subscriber network to the Internet. The router typically acts as a firewall to prevent unauthorized access to the subscriber network from the Internet. The router is configured to recognize a SIP proxy server so that traffic from the SIP proxy server is allowed through to the subscriber network. VoIP connections can be made to and from the SIP phone through the SIP proxy server.

In order for a subscriber telephone to communicate over the VoIP system, the telephone must be coupled to the router. A traditional analog telephone can connect to the router through a VoIP modem, which includes a standard telephone connection into which the telephone is connected and a LAN (Local Area Network) connector (e.g., Ethernet) for communicating with the router over a LAN, and which performs the necessary analog-to-digital and digital-to-analog conversions (and other functions, such as forming packets including digitized voice data) to enable communications over the VoIP system. VoIP phones may include the necessary conversion logic and LAN connector for operating in the VoIP system. For convenience, the term "SIP phone" may be used hereinafter to refer to a VoIP phone or phone/modem combination that can communicate over the VoIP system.

One advantage of SIP is that each SIP phone is not required to have a global IP (GIP) address. Rather, a Distributed Host Configuration Protocol (DHCP) server dynamically assigns IP addresses to the SIP phones in the subscriber network, and a Network Address Translator (NAT) performs IP address translations between a GIP address associated with the router and the IP addresses assigned to the individual SIP phones. The router can act as the DHCP server and/or the NAT.

SIP adds a little more complexity to the system, as it is able to penetrate router/NAT and firewalls. Among other things, this allows the BB-SIP-Phone to work with a PBX from the existing LAN/Internet infrastructure in place.

An example of how a telephone connection may be established in an SIP-based VoIP system is described with reference to FIGS. 1A–1H. FIG. 1A shows the various elements in the system, including SIP phones 530 and 540, SIP stateful proxy servers 520 and 550, an SIP stateless proxy server 510, and an SIP redirect server 560. In FIG. 1B, the SIP phone 530 sends an invite to SIP proxy server 520, which in turn sends an invite to SIP redirect server 560. In FIG. 1C, SIP redirect server 560 indicates to SIP proxy server 520 that it has moved temporarily. In FIG. 1D, SIP proxy server 530 sends an acknowledgement (ACK) to SIP redirect server 560 and sends a second invite to SIP proxy server 510. In FIG. 1E, SIP proxy server 510 sends an invite to SIP proxy server 550, which in turn sends an invite to SIP phone 540. In FIG. 1F, SIP phone 540 sends an OK to SIP proxy server 550, which in turn sends an OK to SIP proxy server 510, which in turn sends an OK to SIP proxy server 520, which in turn sends an OK to SIP phone 530. In FIG. 1G, SIP phone 530 sends an ACK to SIP proxy server 520, which in turn sends an ACK to SIP proxy server 550, which in turn sends an ACK to SIP phone 540. In FIG. 1H, the final in-call signaling path between SIP phone 530 and SIP phone 540 goes through SIP proxy server 520 and SIP proxy server 550.

SUMMARY OF THE INVENTION

In accordance with one aspect of the invention, a personal internet telephony apparatus includes a network interface for sending and receiving internet telephony signals over the communication network, a telephone interface for sending telephone control signals to a telephone device and receiving telephone control signals from the telephone device, and a controller that implements a personal internet telephony feature server for directing telephone calls, intended for the telephone device, received as internet telephony signals over the network interface and managing telephone services on behalf of the telephone device based on the telephone control signals received from the telephone device over the telephone interface.

The apparatus may be configurable to ring the telephone device over the telephone interface upon receiving a telephone call over the network interface, and may further be configurable to ring at least one other telephone device over the network interface simultaneously with ringing the telephone device over the telephone interface. The apparatus may be configurable to ring at least one other telephone device over the network interface if the telephone device is not answered within a predetermined time. The apparatus may be configurable to forward a telephone call to another telephone device over the network interface in lieu of ringing the telephone device over the telephone network upon receiving a telephone call over the network interface. The apparatus may be configurable to generate a call waiting signal to the telephone device over the telephone interface upon receiving a telephone call over the network interface. The apparatus may be configurable to interrupt an existing telephone call to the telephone device with a new telephone call received over the network interface. The apparatus may be configurable to permit one-way communication from a new telephone call received over the network interface to the telephone device over the telephone network. The apparatus may be configurable to direct telephone calls based on time of day. The apparatus may include a web-based management interface accessible through the network interface.

Thus, a personal internet telephony apparatus may include means for directing telephone calls, intended for the telephone device, received as internet telephony signals over the network interface, and means for managing telephone services on behalf of the telephone device based on the telephone control signals received from the telephone device over the telephone interface.

In accordance with another aspect of the invention, a hierarchical internet telephony system includes a higher tier internet telephony feature server coupled to a communication network for directing telephone calls for a plurality of users and a plurality of lower tier internet telephony feature servers in communication with the higher tier internet telephone feature server over the communication network for directing telephone calls for an individual user. The higher tier internet telephony feature server is configurable to direct telephone calls to the personal internet telephony feature servers. Each lower tier internet telephony feature server is separately configurable to direct telephone calls forwarded to it by the higher tier internet telephony feature server.

DETAILED DESCRIPTION OF A PREFERRED EMBODIMENT

Figure 1A:
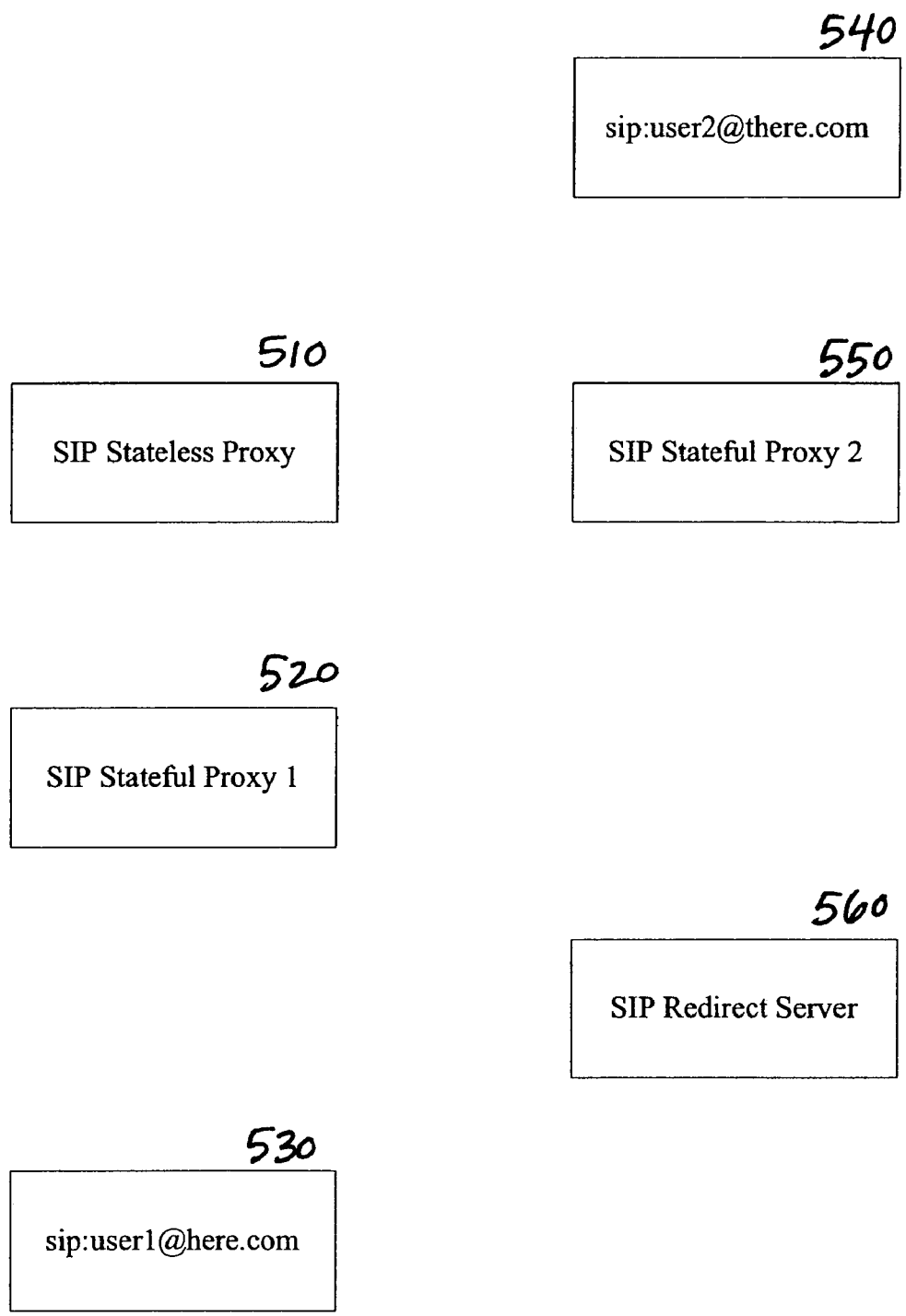
FIGS. 1A–1H provide an example of how a telephone connection may be established in an SIP-based VoIP system as known in the art.
Figure 1B:
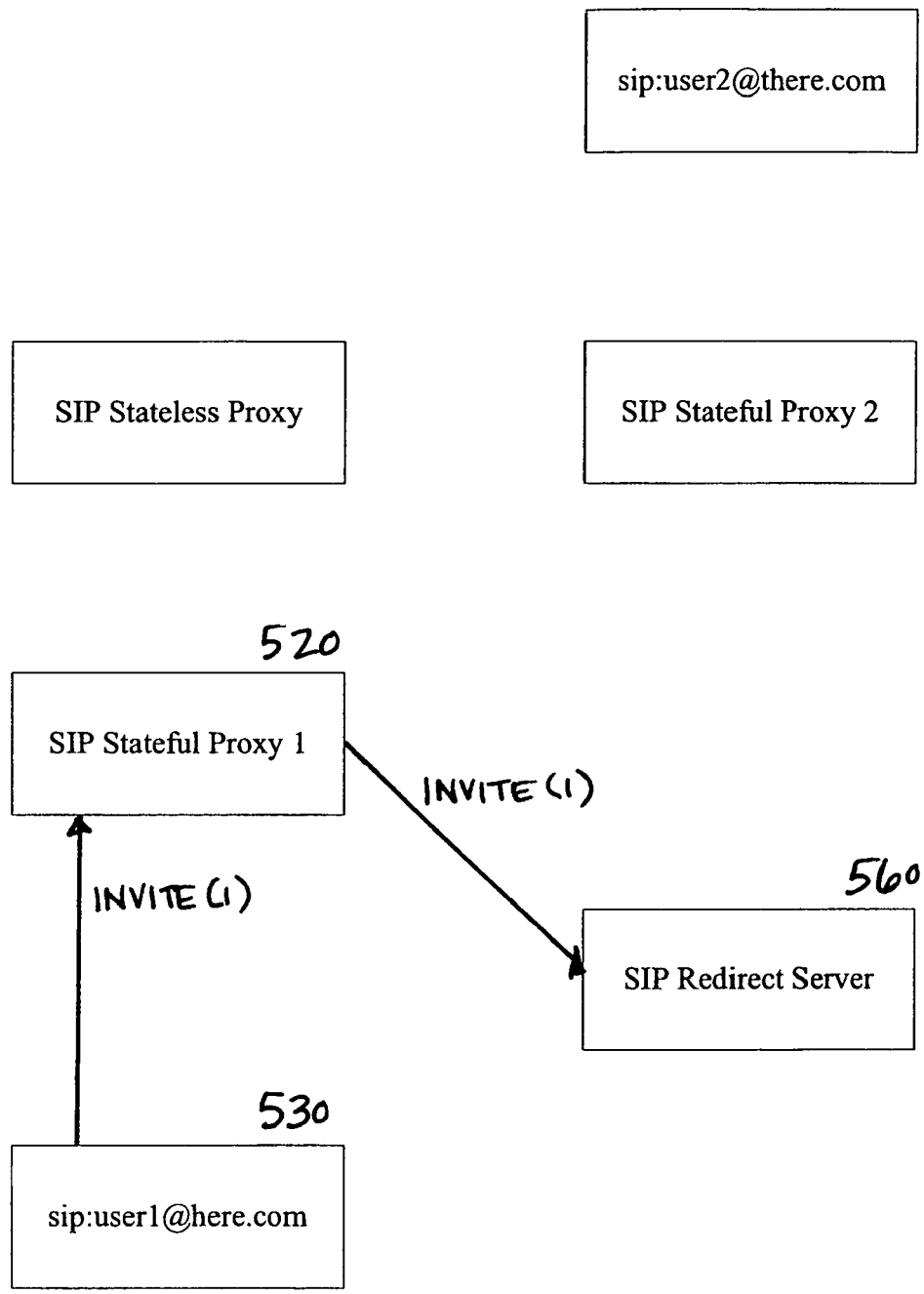
Figure 1C:
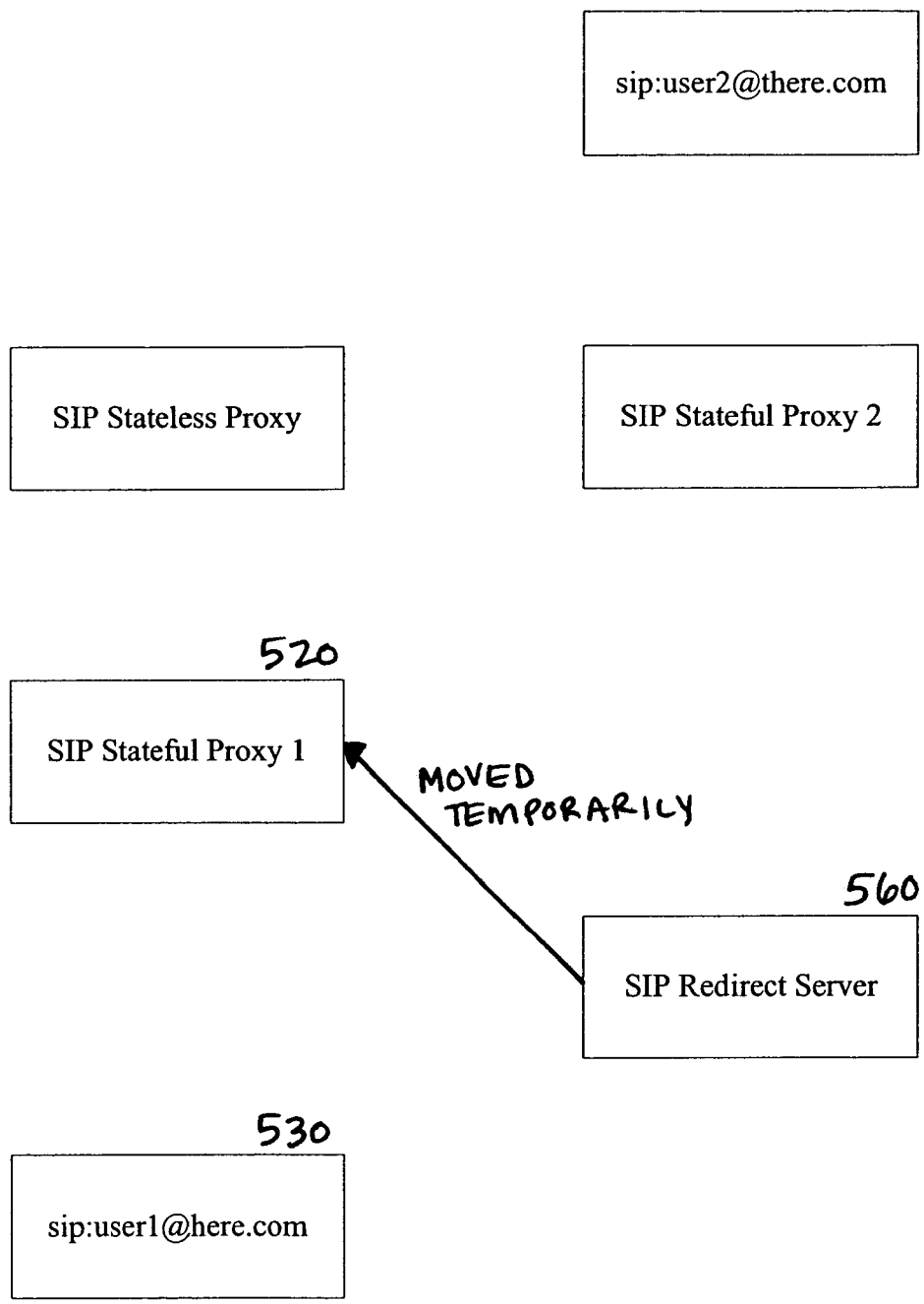
Figure 1D:
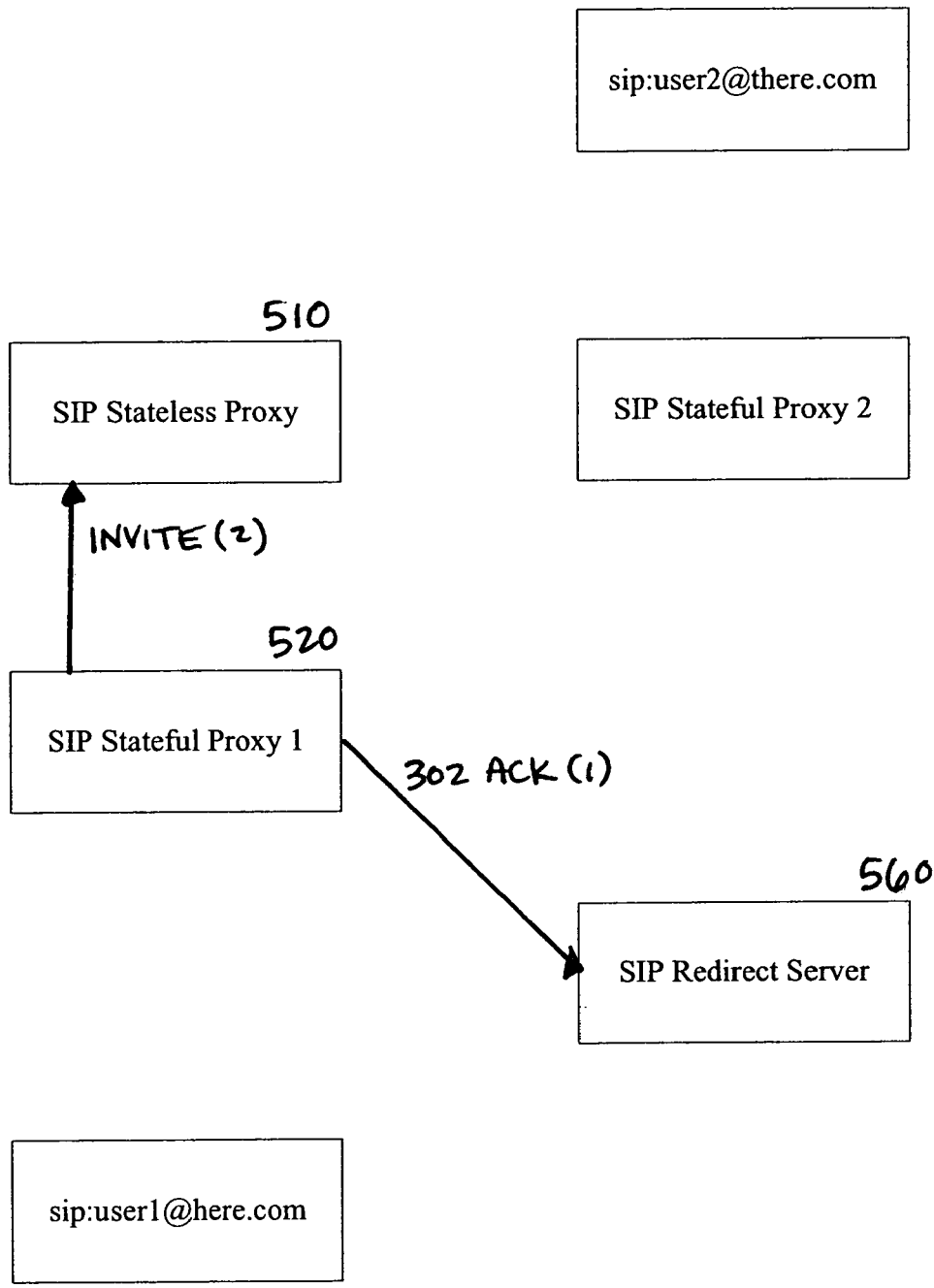
Figure 1E:
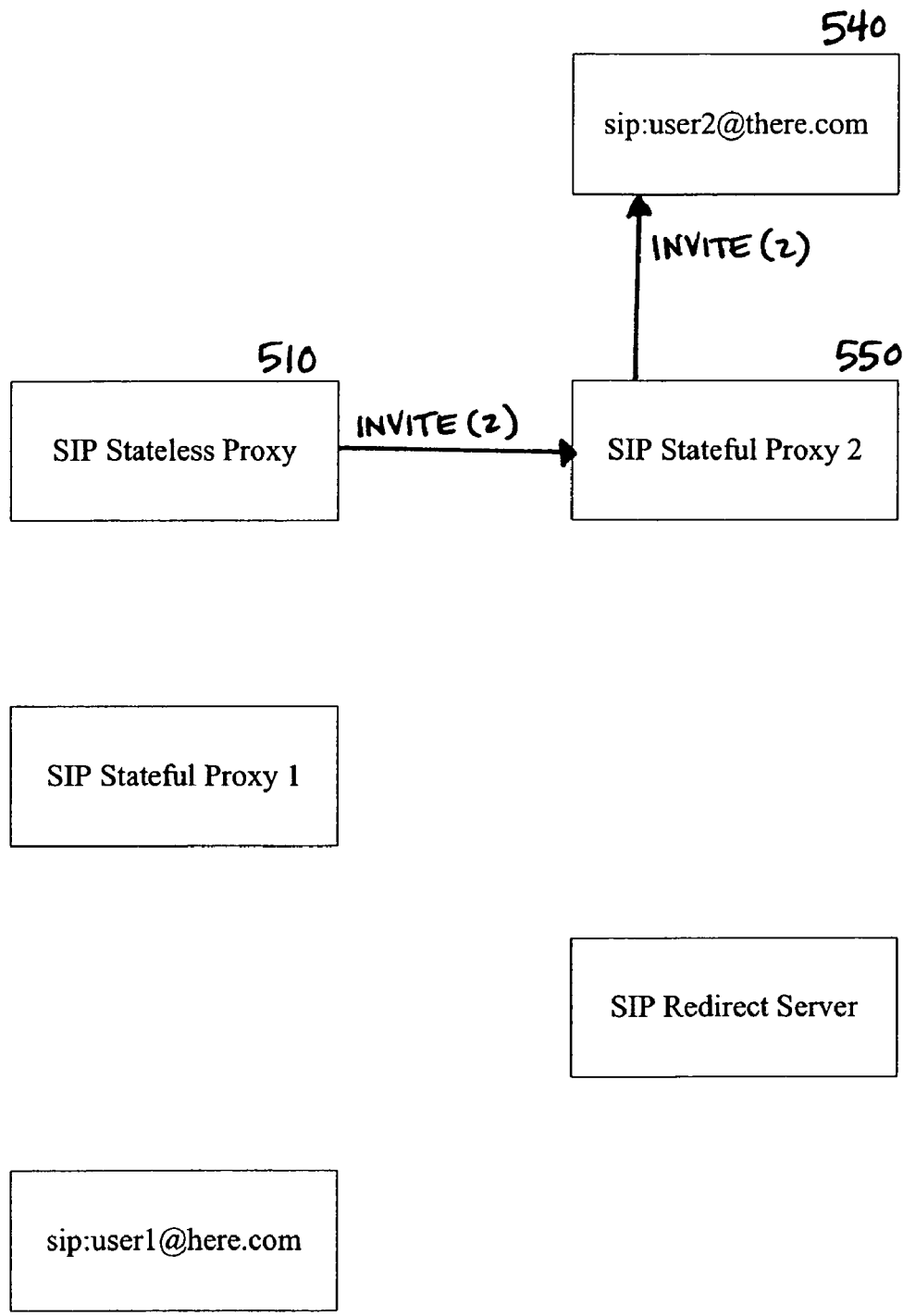
Figure 1F:
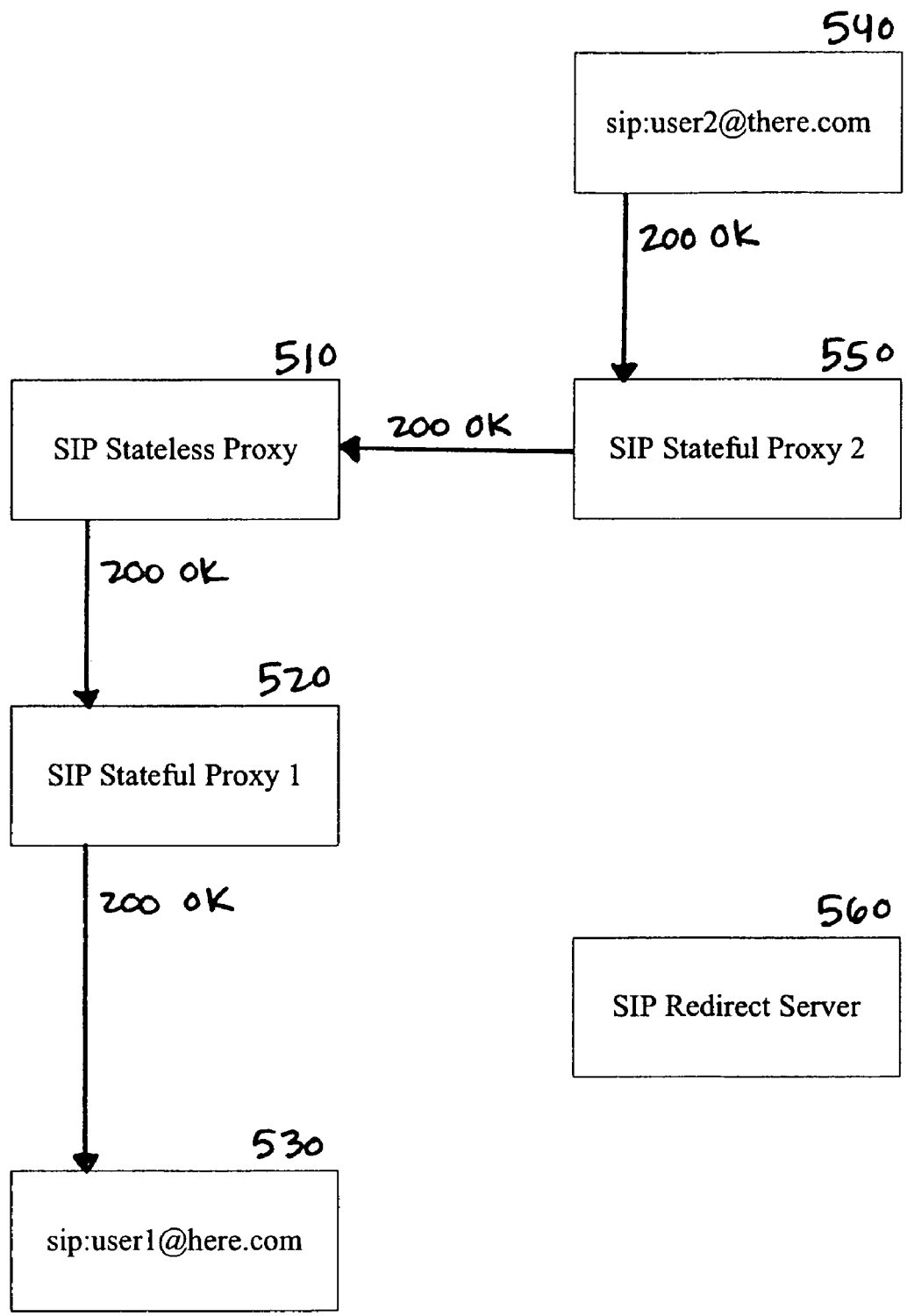
Figure 1G:
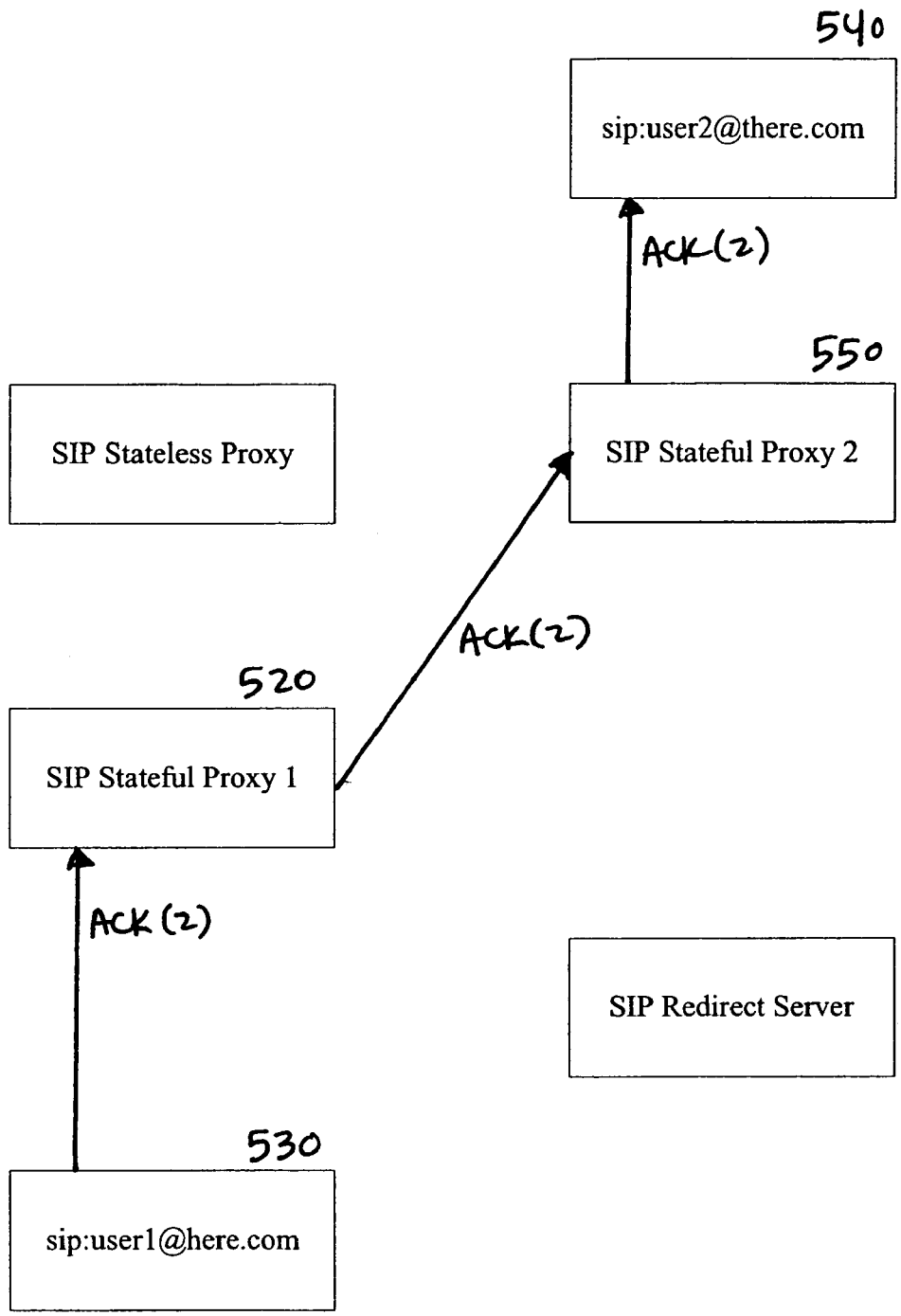
Figure 1H:
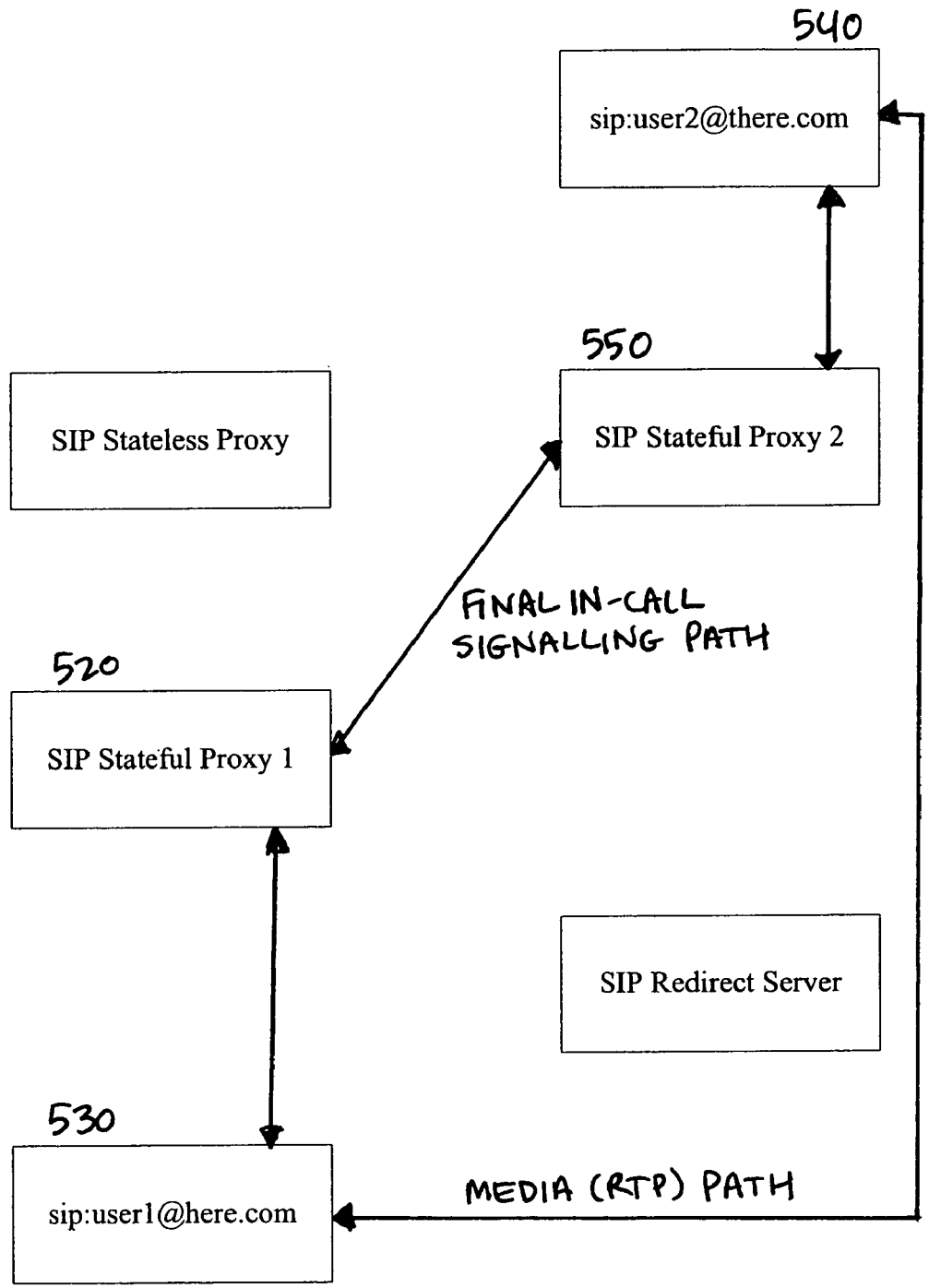

In embodiments of the present invention, one or more feature servers are used to provide advanced telephone services in an SIP-based VoIP system. The feature server(s) can provide many, if not all, PBX functions, as well as more advanced functions. Some exemplary feature server functions are described below.

Each feature server typically manages telephone services for an individual telephone number, and each feature server can operate as a stand-alone element that is not necessarily limited to use with a central PBX (e.g., IP-Centrex). Each subscriber can have a personal feature server that can be configured and managed by the subscriber and that operates independently of other feature servers. In this respect, the feature servers are modular in that there is no central management of the feature servers and feature servers can be easily added and removed from the network. A network of such modular feature servers essentially operates as a virtual PBX, enabling each subscriber to determine how telephone calls are handled independently of the other feature servers in the network. The virtual PBX can therefore essentially obsolete the PBX.

The feature server(s) can be considered part of the VoIP system in that they typically utilize IP to communicate. The feature server(s) can reside within the subscriber network and/or outside the subscriber network (e.g., in the Internet). The feature server(s) can be stand-alone servers or can be multi-functional servers (e.g., an SIP proxy server or SIP redirect server can act as a feature server).

Some exemplary telephone services that can be provided by the feature server(s) include:
Central number and hunting assignment.
Call holding.
Call transfer.
Simultaneous ring.
Interrupt.
Conference call.

A central number service is one in which a subscriber is associated with a central telephone number, and the central telephone number in turn is associated with one or more extension telephone numbers (e.g., home phone number, work phone number, cell phone number, alternate phone number, secretary or answering service phone number, etc.). When the feature server receives a call to the central telephone number, the feature server causes one or more of the extension telephone numbers to be called. The subscriber may specify that multiple extension telephone numbers be called simultaneously (sometimes referred to as "simultaneous ring"). The subscriber may specify multiple extension telephone numbers to be called in a predetermined sequence (sometimes referred to as "hunting"). The subscriber may specify extension telephone numbers to be called during certain times of the day (e.g., during business or non-business hours) or after no response to an earlier called extension telephone number.

A call holding service is one in which the subscriber can cause a telephone call to be placed on hold. Where the SIP phone is a traditional analog telephone, the subscriber would typically dial a predetermined command (e.g., "*H") on the telephone keypad. Upon receiving the command, the feature server places the call on hold. The subscriber may then be permitted to dial or receive another call.

A call transfer service is one in which the subscriber can cause a telephone call to be transferred. Where the SIP phone is a traditional analog telephone, the subscriber would typically dial a predetermined command (e.g., "*T") followed by the number to which the call is to be transferred. Upon receiving the command, the feature server transfers the call to the specified number.

A simultaneous ring service is one in which multiple extension telephone numbers are rung essentially at the same time when a call is received for a predetermined telephone number. An example of this was described above with reference to central telephone number. However, the simultaneous ring service can be provided for any phone number. For example, the subscriber can provide alternate telephone numbers to be called when a home phone number or direct business phone number is called.

An interrupt service is one in which an outside party is permitted to interrupt an ongoing telephone call to a subscriber. This can be handled in a number of ways. For example, the call may be placed on hold and the outside party patched into the subscriber so that the subscriber and the outside party can communicate exclusively, the outside party may be conferenced in so that all three parties can communicate, or the outside party may be permitted to speak one-way to the subscriber (e.g., whisper). The interrupt service can be controlled by the subscriber using commands entered through the keypad.

A conference call service is one in which multiple parties (typically more than two, although two parties can also be considered to be a conference) are connected.

Figure 2:
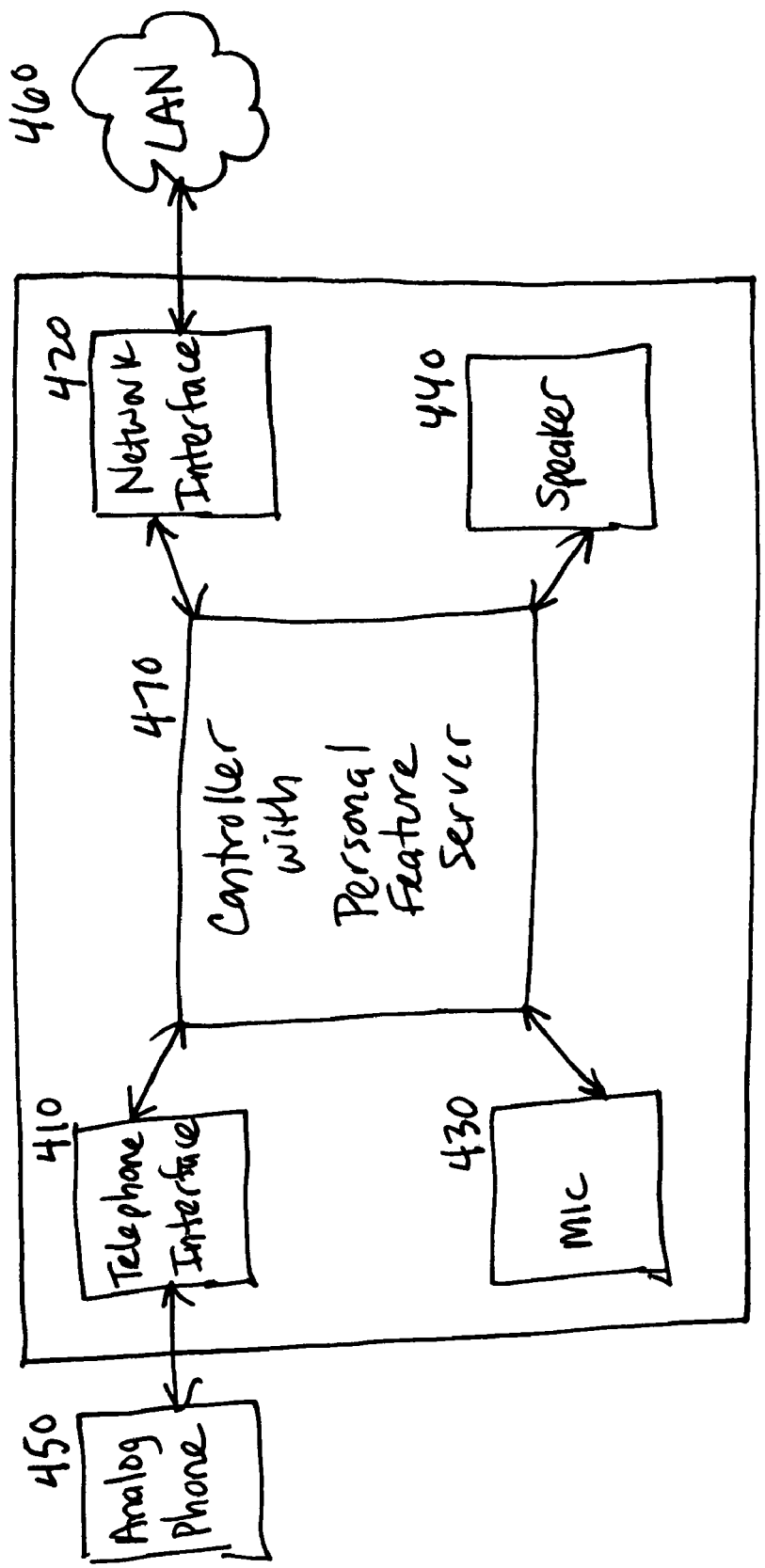
FIG. 2 shows an exemplary VoIP modem in accordance with an embodiment of the present invention.

Other types of functions can also be provided by the feature server(s), for example, using commands entered by the subscriber using the keypad. For example, the feature server(s) can provide such functions as mute, last number redial, flash, voice mail, FIG. 2 shows an exemplary VoIP modem 400 in accordance with an embodiment of the present invention. Among other things, the VoIP modem 400 includes a telephone interface 410 into which a standard analog telephone 450 can be connected and a network interface 420 (such as an Ethernet interface) for connecting to a communication network, such as a LAN (local area network) 460. The VoIP modem 400 may also include a microphone 430 and/or speaker 440. The microphone 430 and speaker 440 can be used to provide speakerphone-type services. The VoIP modem 400 includes a controller 470 implementing, among other things, a personal feature server for managing telephone calls received over the network interface 420 and interacting with the analog telephone 450 connected to the POTS interface 410.

The VoIP modem 400 has a number of advantages over a traditional PBX. One advantage of the VoIP modem 400 over a traditional PBX is that the VoIP modem 400 allows inexpensive consumer telephones to be used, whereas the PBX typically requires the use of more expensive business telephones that are designed for the specific PBX. Another advantage of the VoIP modem 400 over a traditional PBX is that the personal feature server can be managed by the user so that changes can be made quickly and easily, whereas the PBX is typically controlled and managed by a single person or group (e.g., an Information Technology group of a company) and so changes must be coordinated through that person or group. Yet another advantage of the VoIP modem 400 over a traditional PBX is that the VoIP modem 400 is portable, so the user can connect the modem the network wherever it is convenient and telephone calls will reach the modem using regular IP mechanisms. Thus, for example, telephone calls from a work extension can continue to be forwarded to the user when the user is away from the office or even after the user has left the company, provided the company's feature server is configured to forward calls for that user's extension to the user's modem. Also, the user can be easily moved from one office to another office while maintaining the same extension by simply moving the modem 400, whereas the PBX must typically be reconfigured when a user moves from one office to another office in order for the user to keep the same extension.

When a telephone call is received over the network interface 420, the controller 470 can be configured to ring the telephone 450 via the telephone interface 410, simultaneously ring the telephone 450 via the telephone interface 410 and one or more other phone numbers via the network interface 420, or immediately forward the call to another telephone via the network interface 420, among other things. If the telephone 450 is rung and is not answered within a predetermined amount of time (or number of rings), then the controller 470 can be configured to forward the call to another telephone via the network interface 420. When forwarding a call, the controller 470 can be configured to simultaneously ring one or more other phones via the network interface 420. The controller 470 can be configured with a "chain" of telephone numbers to forward and/or simultaneously ring. Also, when a call is received over the network interface 420 and analog phone 450 is already in use, the controller 470 can be configured to automatically forward the call, generate a call waiting signal to the phone 450, interrupt the phone 450, or permit one-way communication from the new caller to the phone 450 (i.e., whisper), among other things. The controller 470 can receive signals from the phone 450 and perform various advanced telephone functions (e.g., "*F" or "flash" to switch between two or more calls, "*H" to put a call on hold, "*M" to mute the phone, "*S" for speakerphone, "*C" for conference calling, "*X" to transfer a call, "*V" to change handset volume, etc.).

In exemplary embodiments of the invention, the personal feature server includes a web-based interface that is configurable through the network interface 420. Thus, when the modem 400 is connected to the network 460, it is easy for the user to manage and configure the personal feature server using a traditional web browser. Security mechanisms are preferably provided by the personal feature server so that only the user or other authorized persons can access the personal feature server.

Figure 3:
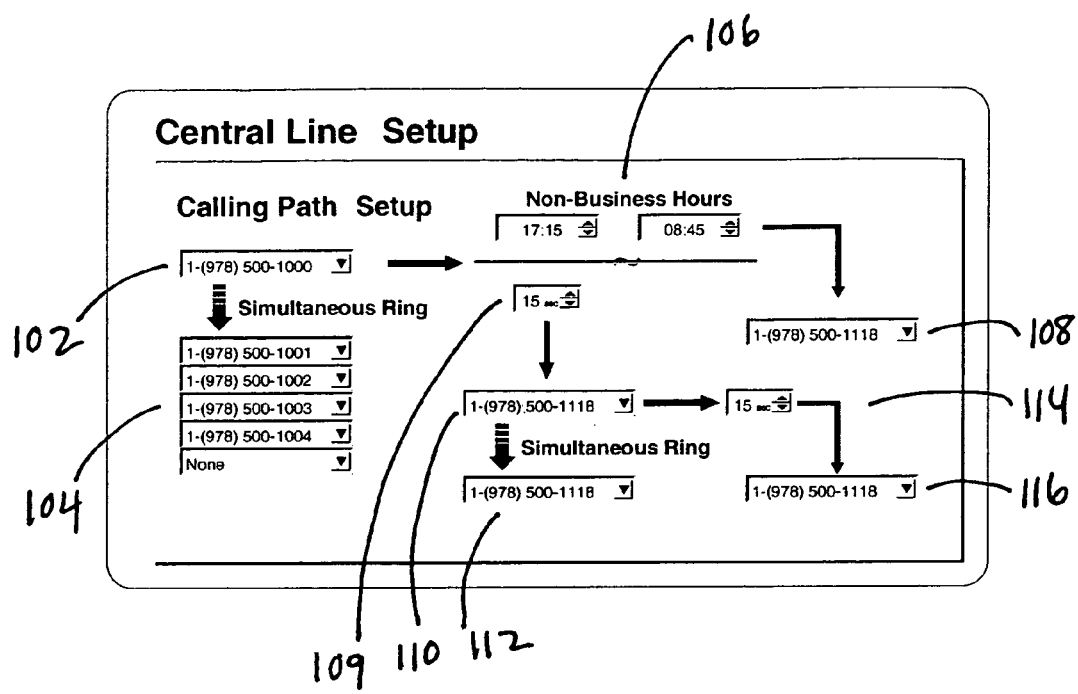
FIG. 3 shows an exemplary central line setup screen in accordance with an embodiment of the present invention.

FIG. 3 shows an exemplary central line setup screen 100 in accordance with an embodiment of the present invention. When the feature server receives a call to the central telephone number 102, the feature server causes the extension phone numbers 104 to be called simultaneously, except during specified non-business hours 106, in which case the non-business hours telephone number 108 is called. If the extension phone numbers 104 are called and none are answered within a predetermined time 109, then an alternate number 110 is called. If any other numbers are listed in 112, then those numbers are called simultaneously. If no call is answered within a predetermined time 114, then a last number 116 is called.

Figure 4:
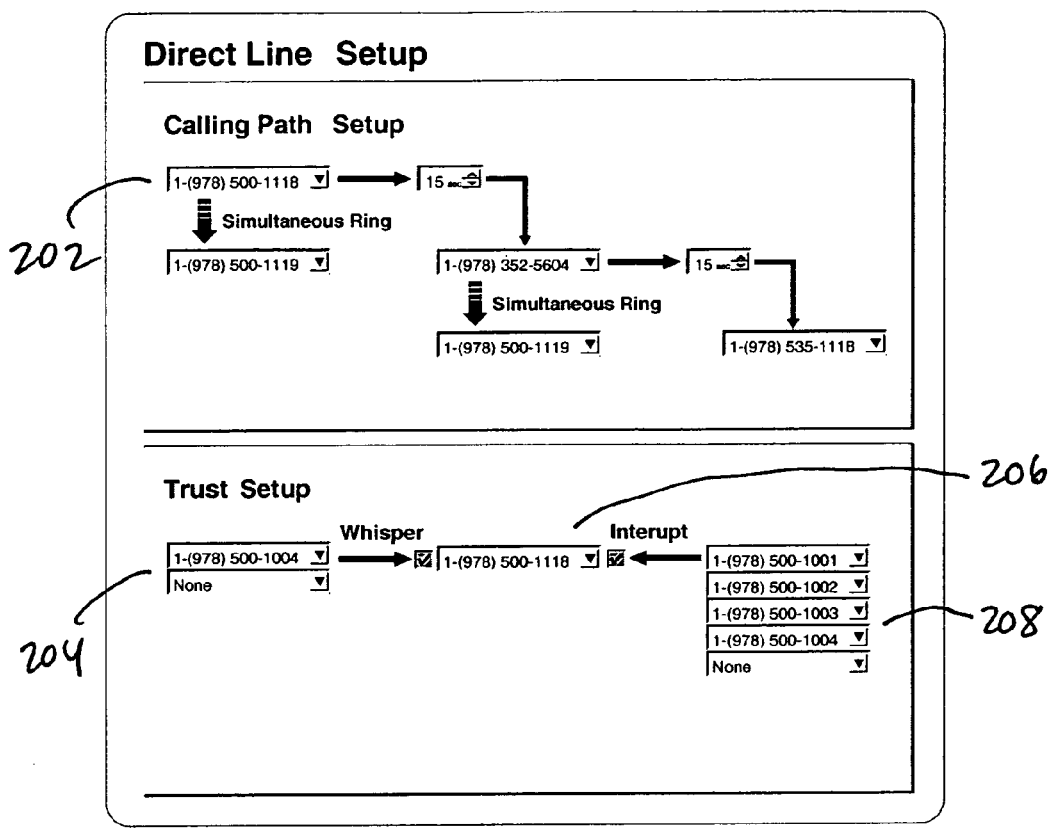
FIG. 4 shows an exemplary direct line setup screen and an exemplary trust setup screen in accordance with an embodiment of the present invention.

FIG. 4 shows an exemplary direct line setup screen and an exemplary trust setup screen in accordance with an embodiment of the present invention. This is very similar to central call setup, except that the telephone number 202 would typically be the actual number associated with the subscriber (e.g., home phone number or direct work number). Again, the subscriber can specify simultaneous ring and alternate numbers as well as the amount of time to delay before forwarding to an alternate number. The subscriber can also specify, for the phone number 206, a number of "whisper" numbers 204 (i.e., persons who are permitted to speak to the subscriber when the subscriber is on a phone call) and a number of "interrupt" numbers 208 (i.e., persons who are permitted to interrupt the subscriber when the subscriber is on a phone call).

Figure 5:
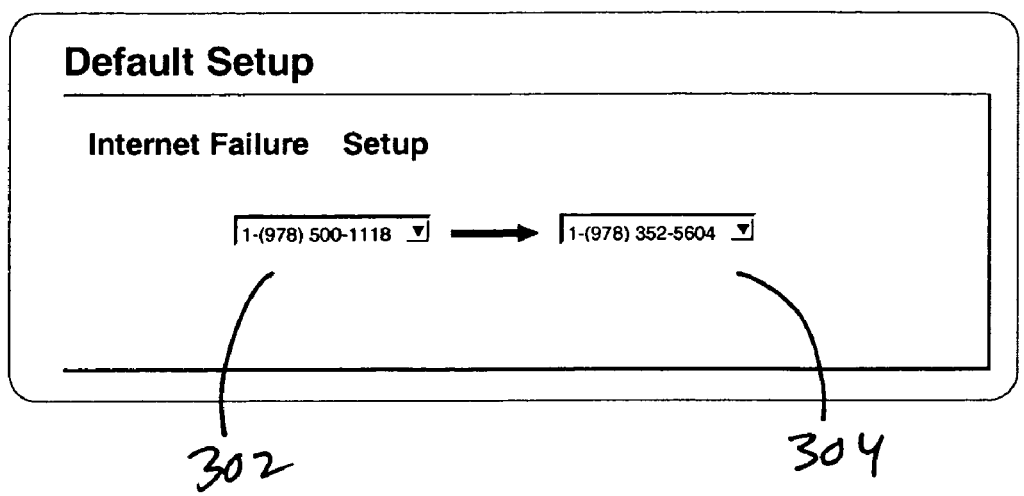
FIG. 5 shows an exemplary default setup screen in accordance with an embodiment of the present invention.

FIG. 5 shows an exemplary default setup screen in accordance with an embodiment of the present invention. Here, the subscriber can specify a default telephone number 304 to be called in case the main number 302 is unavailable due to an Internet failure.

These set up screen shots should illustrate that a PBX is no longer a necessity. However, this type of IP phone can work with an existing PBX installed. Over time, this scalability will obsolete the PBX as more and more IP phone features replace the current PBX's features until the PBX is no longer needed.

In one exemplary embodiment of the invention, VoIP modems of the type described above are added into corporate telephone networks. The user generally connects the VoIP modem to the corporate network and sets the feature server to work with the current system. Phone calls are essentially free. Rather than buying expensive phones for use with the PBX, the subscriber can purchase inexpensive analog phones (or, for that matter, fancy "designer" phones that look better than traditional business phones). Even if the office changes its layout, or someone is transferred to another office, the phone number would not have to be changed. All that would need to be done is to use the VoIP modem, access the Web, and make any necessary changes to the screen setups (e.g., new secretary's number). The system could easily transition exclusively to VoIP, in which case the PBX could be eliminated.

It is preferable, although not required, for the VoIP modem to be designed to be thin and flat, with all connectors in the back and LEDs in the front of the unit. This way, the telephone set of a customer's choice (any normal analog telephone would do) could sit on top of it without taking up extra space or giving a cheap and awkward appearance on the office desk.

In order to provide certain advanced telephone functions using analog telephones (such as speakerphone, announce and transfer, and hands-free answer), certain VoIP modems in accordance with an embodiment of the present invention would include a built-in speaker and possibly a microphone, as described above.

It is desirable for the feature servers to be available regardless of what ISP the customer using. Therefore, the broadband (BB) phone must work from inside routers/NAT translators and firewalls without an explicit global IP (GIP) address assigned for the VoIP modem.

The BB Internet Service can use any technology, including cable modem and ADSL. For larger customers, such as corporate users, fiber connectivity to the Internet could be used.

The feature service should be available for both residential and corporate users. Varying the available features should differentiate the types of service. It is scalable from residential to corporate. For example, residential may not require central number service.

The VoIP modem should be considered as an embodiment of the invention in and of itself—either sold stand-alone or leased.

Figure 6:
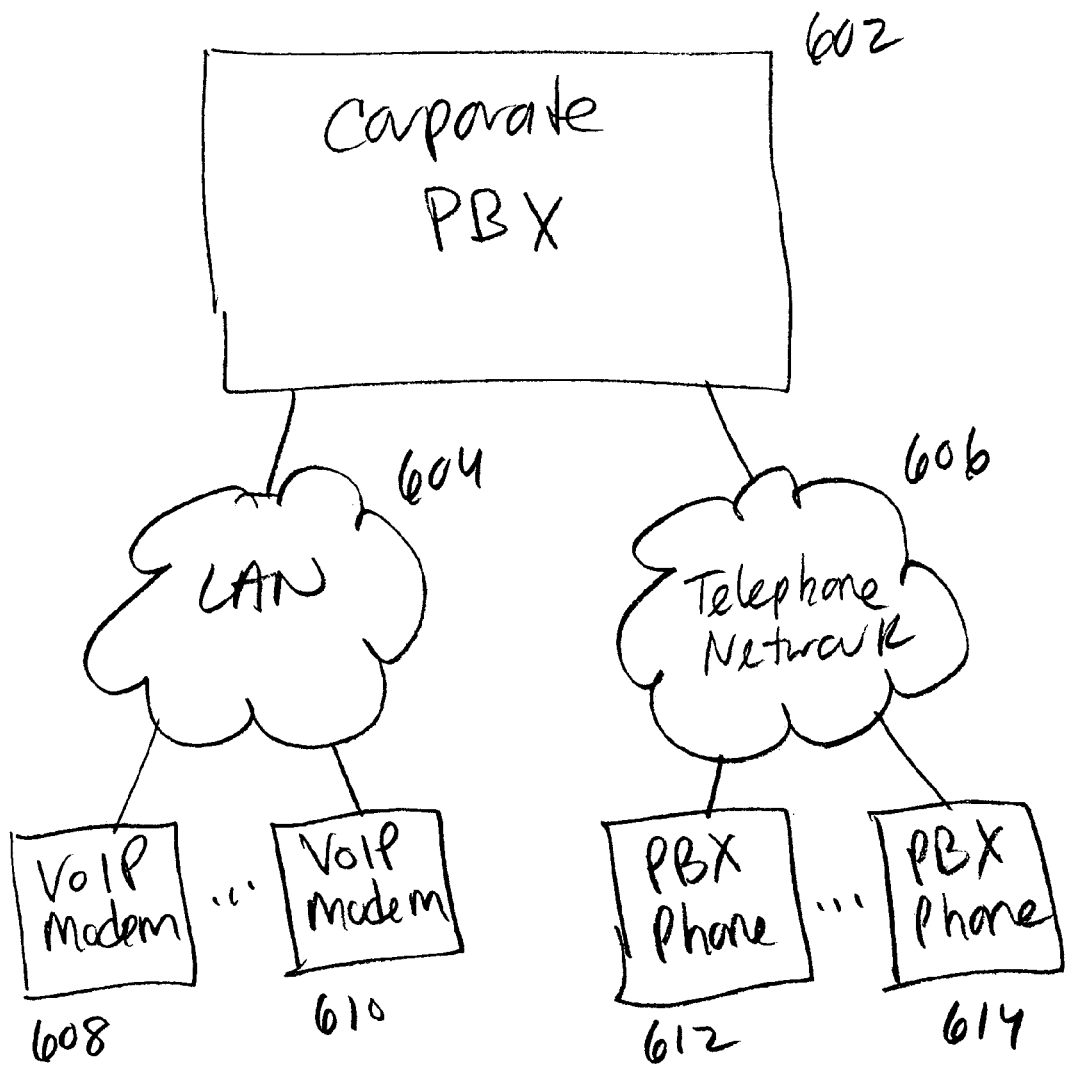
FIG. 6 shows a corporate telephone system incorporating both PBX and VoIP technologies in accordance with an embodiment of the present invention.

FIG. 6 shows a corporate telephone system incorporating both PBX and VoIP technologies in accordance with an embodiment of the present invention. Among other things, the telephone system includes a corporate PBX 602 in communication with VoIP modems 608 and 610 over a LAN 604 and in communication with PBX phones 612 and 614 over a telephone network. The VoIP modems 608 and 610 preferably include personal feature servers that can be managed by the corresponding user so that central management of the user's specific telephone requirements is not needed. The VoIP modems 604 can be physically moved from place to place, and phone calls from the corporate PBX

602 will be forwarded correctly without any configuration changes to the corporate PBX 602.

Figure 7:
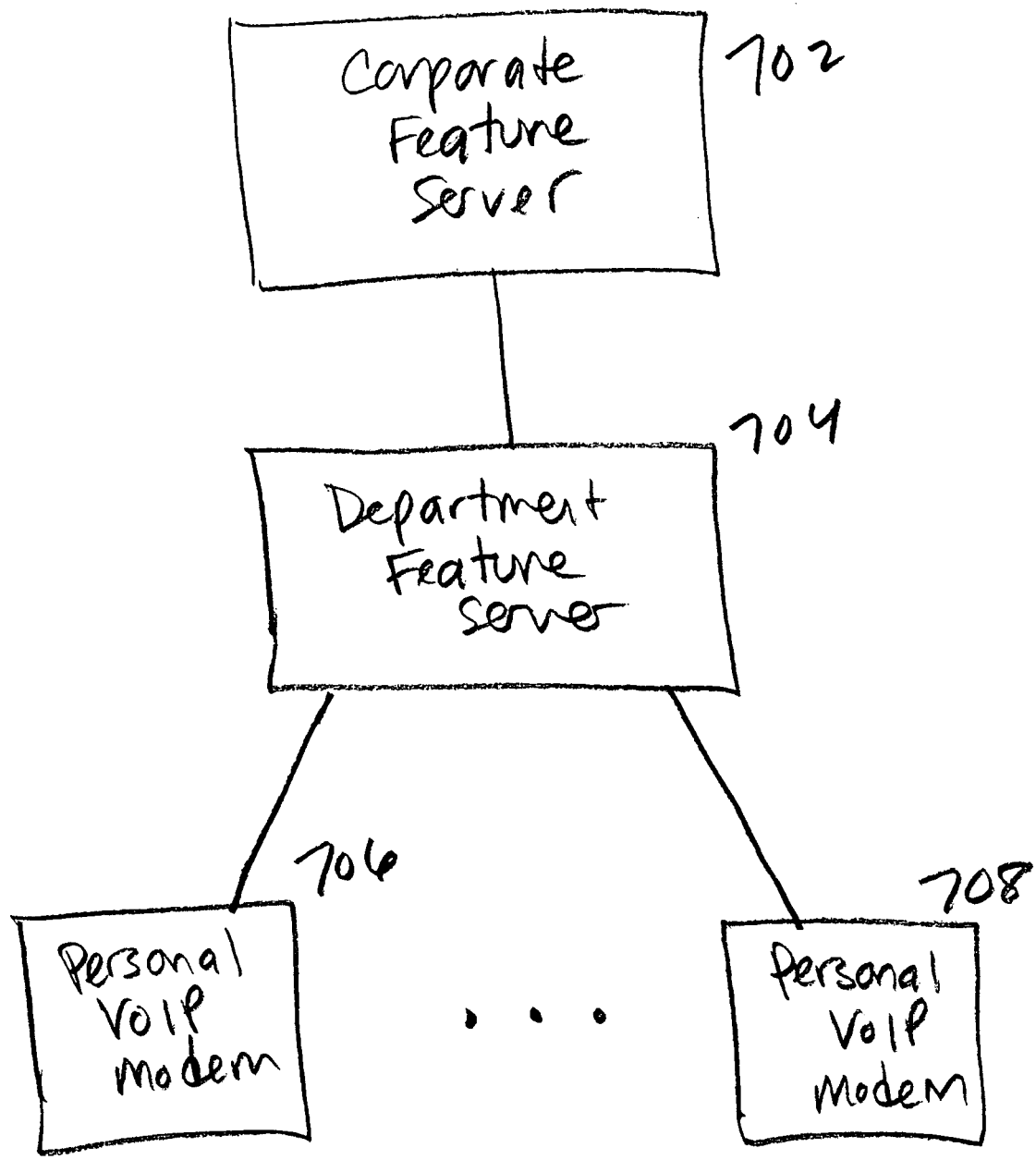
FIG. 7 shows a hierarchical telephone system in accordance with an embodiment of the present invention.

FIG. 7 shows a hierarchical telephone system in accordance with an embodiment of the present invention. Among other things, the telephone system includes a corporate feature server 702, a number of department feature servers 704, and, for each department feature server 704, a number of personal VoIP modems 706 and 708. The corporate feature server 702 can be managed by a corporate manager and relates to the entire corporation. Telephone calls received at the corporate feature server 702 can be forwarded to the appropriate department feature server 704 according to the extension requested. The department feature servers 704 can be managed at the departmental level without impacting the corporate feature server 702. Telephone calls received at the departmental feature server 704 can be forwarded to a personal VoIP modem according to the extension requested. The personal VoIP modems 706 and 708 can be managed by their respective users without impacting the corporate or departmental feature servers. Telephone calls received at the personal VoIP modems 706 and 708 can be forwarded according to the rules provided by the users.

One advantage of the personal VoIP modems is that the users can manage their own telephone environments without impacting the corporate or department feature servers and without involving the corporate or departmental managers. Thus, for example, if a user's secretary is unavailable, the user can easily reconfigure his or her personal feature server to forward calls to a different secretary. If the user will be temporarily in a different location, then the user can easily reconfigure his or her personal feature server to forward or simultaneously ring to the expected location. If the user's cell phone number changes, the user can easily reconfigure his or her personal feature server to forward calls to the new cell phone. If the user is expecting a telephone call from a particular person, the user can reconfigure his or her personal feature server to interrupt when the telephone call is received. In the past, many of these features either were not available to individual users or required that changes be coordinated through a telephone system manager.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the feature server logic is implemented as a set of computer program instructions that is converted into a computer executable form, stored as such in a computer readable medium, and executed by a microprocessor within the feature server under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A personal internet telephony apparatus comprising:
   a network interface, couplable to a communication network, for sending and receiving internet telephony signals over the communication network;
   a telephone interface, connectable to an analog telephone device, for sending telephone control signals to the telephone device and receiving telephone control signals entered through a keypad of the telephone device; and
   a controller operably coupled between the network interface and the telephone interface, the controller implementing a personal internet telephony feature server for directing telephone calls, intended for the telephone device, received as internet telephony signals over the network interface and managing telephone services on behalf of the telephone device based on the telephone control signals received from the telephone device over the telephone interface.

2. A personal internet telephony apparatus according to claim 1, wherein the controller is configurable to ring the telephone device over the telephone interface upon receiving a telephone call over the network interface.

3. A personal internet telephony apparatus according to claim 2, wherein the controller is configurable to ring at least one other telephone device over the network interface simultaneously with ringing the telephone device over the telephone interface.

4. A personal internet telephony apparatus according to claim 2, wherein the controller is configurable to ring at least one other telephone device over the network interface if the telephone device is not answered within a predetermined time.

5. A personal internet telephony apparatus according to claim 1, wherein the controller is configurable to forward a telephone call to another telephone device over the network interface in lieu of ringing the telephone device over the telephone network upon receiving a telephone call over the network interface.

6. A personal internet telephony apparatus according to claim 1, wherein the controller is configurable to generate a call waiting signal to the telephone device over the telephone interface upon receiving a telephone call over the network interface.

7. A personal internet telephony apparatus according to claim 1, wherein the controller is configurable to interrupt an existing telephone call to the telephone device with a new telephone call received over the network interface.

8. A personal internet telephony apparatus according to claim 1, wherein the controller is configurable to permit one-way communication from a new telephone call received over the network interface to the telephone device over the telephone network.

9. A personal internet telephony apparatus according to claim 1, wherein the controller is configurable to direct telephone calls based on time of day.

10. A personal internet telephony apparatus according to claim 1, wherein the feature server includes a web-based management interface accessible through the network interface.

11. A personal internet telephony apparatus comprising:
    a network interface, couplable to a communication network, for sending and receiving internet telephony signals over the communication network;
    a telephone interface, connectable to an analog telephone device, for sending telephone control signals to the telephone device and receiving telephone control signals entered through a keypad of the telephone device;
    personal internet telephony feature server control means for directing telephone calls, intended for the telephone device, received as internet telephony signals over the network interface
    and managing telephone services on behalf of the telephone device based on the telephone control signals received from the telephone device over the telephone interface.

12. A personal internet telephony apparatus according to claim 11, wherein the means for directing telephone calls comprises:
    means for ringing ring the telephone device over the telephone interface upon receiving a telephone call over the network interface.

13. A personal internet telephony apparatus according to claim 12, wherein the means for directing telephone calls comprises:
    means for ringing at least one other telephone device over the network interface simultaneously with ringing the telephone device over the telephone interface.

14. A personal internet telephony apparatus according to claim 12, wherein the means for directing telephone calls comprises:
    means for ringing at least one other telephone device over the network interface if the telephone device is not answered within a predetermined time.

15. A personal internet telephony apparatus according to claim 11, wherein the means for directing telephone calls comprises:
    means for forwarding a telephone call to another telephone device over the network interface in lieu of ringing the telephone device over the telephone network upon receiving a telephone call over the network interface.

16. A personal internet telephony apparatus according to claim 11, wherein the means for directing telephone calls comprises:
    means for generating a call waiting signal to the telephone device over the telephone interface upon receiving a telephone call over the network interface.

17. A personal internet telephony apparatus according to claim 11, wherein the means for directing telephone calls comprises:
    means for interrupting an existing telephone call to the telephone device with a new telephone call received over the network interface.

18. A personal internet telephony apparatus according to claim 11, wherein the means for directing telephone calls comprises:

means for permitting one-way communication from a new telephone call received over the network interface to the telephone device over the telephone network.

19. A personal internet telephony apparatus according to claim 11, wherein the means for directing telephone calls comprises:
means for directing telephone calls based on time of day.

20. A personal internet telephony apparatus according to claim 11, further comprising:
a web-based management interface accessible through the network interface.

* * * * *

UNITED STATES PATENT AND TRADEMARK OFFICE
CERTIFICATE OF CORRECTION

PATENT NO. : 7,248,577 B2 Page 1 of 1
APPLICATION NO. : 10/729871
DATED : July 24, 2007
INVENTOR(S) : Shigeaki Hakusui It is certified that error appears in the above-identified patent and that said Letters Patent is hereby corrected as shown below:

In Col. 12, line 27, claim 12
replace "means for ringing ring the telephone device over the"
with " means for ringing the telephone device over the"

Signed and Sealed this

Second Day of December, 2008

JON W. DUDAS
*Director of the United States Patent and Trademark Office*